June 1, 1937.   R. S. TROTT   2,081,965
AUTOMOTIVE VEHICLE
Original Filed Aug. 24, 1923   3 Sheets-Sheet 1
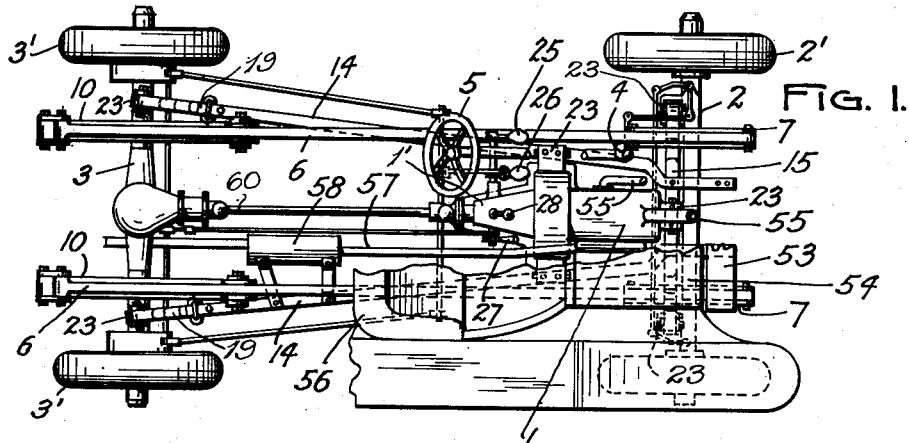
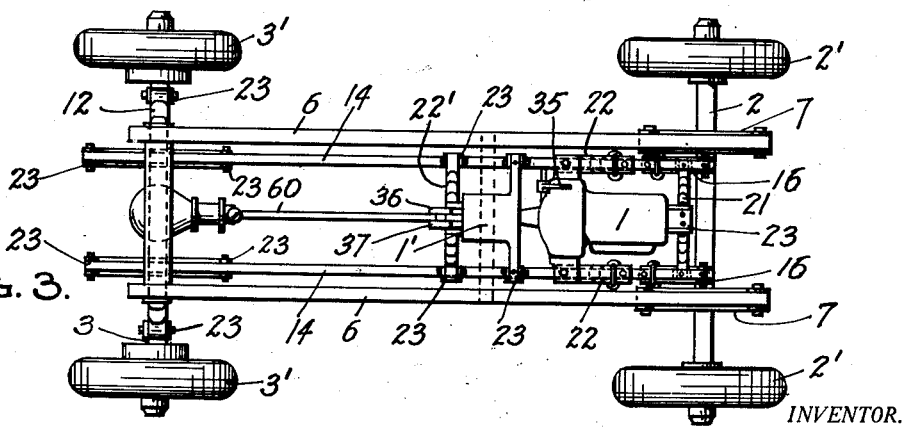
INVENTOR.
Rolland S. Trott June 1, 1937.  R. S. TROTT  2,081,965
AUTOMOTIVE VEHICLE
Original Filed Aug. 24, 1928   3 Sheets-Sheet 2
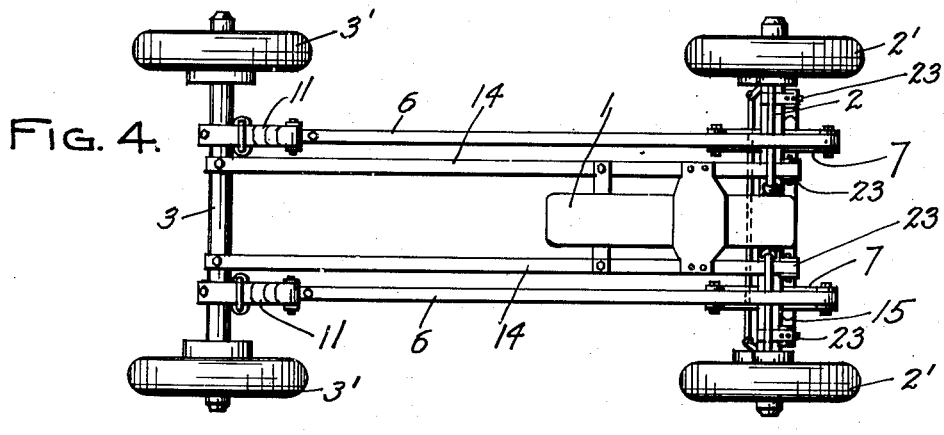
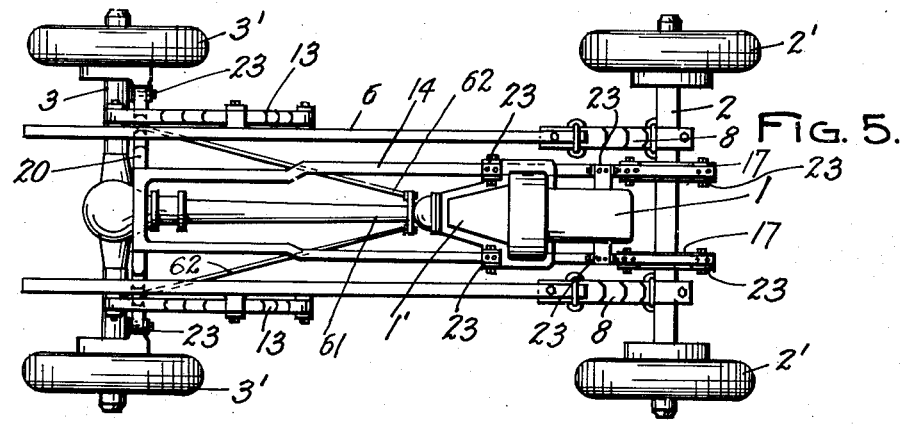
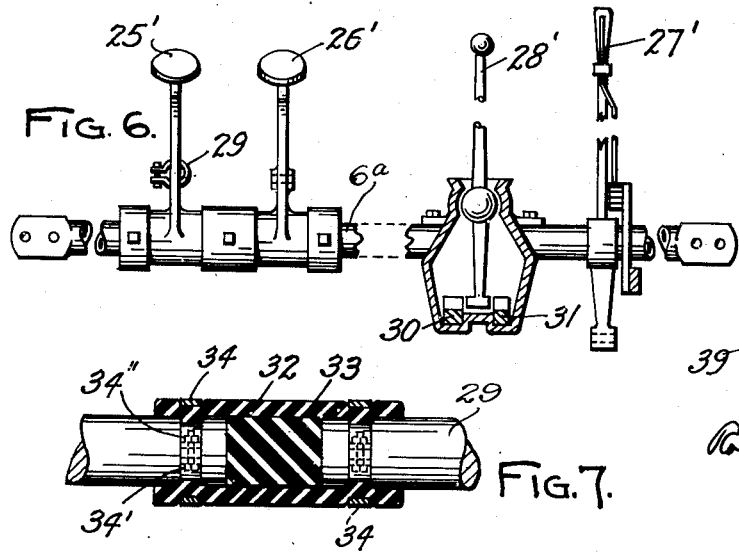
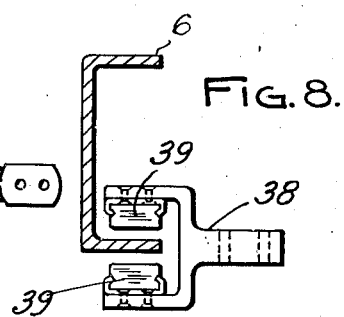
INVENTOR.
Rolland S. Trott June 1, 1937.                R. S. TROTT                2,081,965
                          AUTOMOTIVE VEHICLE
                 Original Filed Aug. 24, 1923    3 Sheets-Sheet 3

INVENTOR.
Rolland S. Trott

Patented June 1, 1937

2,081,965

UNITED STATES PATENT OFFICE 2,081,965

AUTOMOTIVE VEHICLE

Rolland S. Trott, Denver, Colo.

Application August 24, 1928, Serial No. 301,819
Renewed September 28, 1935

6 Claims. (Cl. 180—55)

My invention relates to automotive vehicles and their power plants and more especially to the mounting of power plants of automotive vehicles.

As is well known, the trend of the design of automobiles for some years has been toward higher engine and road speeds, closed bodies, and power plants with more cylinders.

The trend toward more cylinders has not been primarily for the purpose of obtaining more power, but to obtain a smoother running engine and thereby reduce body rumble, decrease the vibration of the steering wheel and in general reduce the annoyance and nerve strain of the passengers by reason of the increased smoothness.

The multiple cylinders provide overlapping power impulses, and this combined with other improvements in the engines and their mountings has tended to minimize the amount of engine vibration felt by the passengers. That is, the engine sensation has been reduced.

Improvements in the transmission have also tended to decrease the noise and the vibration when in the intermediate, low or reverse gears, and this has further increased the comfort of riding in closed bodies.

But in even the most advanced designs the vibration of the engine is still transmitted to the passengers, and although this engine sensation is small, it is present, especially when the engine is pulling.

This can be proven with any automobile now on the market by placing the finger tips gently against the body when the engine is pulling, and again when it is not pulling, or when the engine is dead and the car is moving along with the transmission in neutral.

Vibrationless engines have been claimed but as yet never obtained, as can be proven at once by the above mentioned finger tip test.

And even in the most expensive cars, both noise and vibration increase when the engine is pulling in the intermediate, low or reverse gears; and this in closed bodies results in an unpleasant sensation upon the ear drums.

The object of my invention is to provide a power plant mounting which, in the finest cars, such as those with six or eight cylinder engines, will eliminate body rumble and steering wheel quiver due to engine and transmission gear vibration.

A further object is to provide a power plant mounting which even in four cylinder engines will practically eliminate the transmission of any engine or gear sensation to the passengers.

A further object is to provide a power plant mounting and vehicle construction in which the power plant and running gear will form a practically self-contained power unit, which may be assembled and moved about on its wheels in the process of manufacture before the body frame and parts mounted thereon are attached thereto.

A further object is to provide such a power unit construction in which, with a minimum of time and labor, different load units composed of springs, frame, body and fenders may be interchangeably installed upon the power unit.

I attain the above objects by a construction which is based upon the following illustration:—

If railroad sleeping cars were constructed upon a locomotive and the locomotive engine then redesigned to operate with as little vibration as possible, the construction would be the same in principle, as the present standard construction of the automotive vehicle; that is, the passengers and the power plant are mounted upon the same frame, and refinements in the power plant are relied upon to reduce the unpleasant sensations of the passengers.

The well known smooth and pleasant sensation of riding in a railroad sleeping car is obtained by complete separation of the locomotive and the sleeping cars, and their connection by spring draw bars only.

So, in my invention, I attain the desired objects by providing two separate frames, independently mounted upon the axles of the vehicle; one frame, the power plant or engine frame, with wheels, axles, and power plant, forming what is called the power unit; and the other frame, the body frame, with body, fenders and hood, forming what is called the load unit.

My invention is clearly shown in the drawings, in which:—

Figure 1 is a plan view of a vehicle showing fragmentary portions of the radiator, hood and body, the vehicle having semi-elliptic front and rear springs for the body frame; quarter elliptic springs for the rear of the engine frame, and a cross elliptic spring for the front of the engine frame, the power plant frame springs being mounted on the axles by rubber mountings and the power plant being mounted on its frame by rubber mountings.

Figure 2 is a plan view of a vehicle having front and rear cross springs on the body frame, quarter elliptic springs for the rear of the power plant frame, and a cross spring for the front of the power plant frame, the power plant being mounted on its frame by rubber mountings and the power plant frame springs being mounted on the axles by rubber mountings.

Figure 3 is a plan view showing a body frame with semi-elliptic front springs and a cross rear spring, with rubber mountings on the rear axle, and quarter elliptic front springs and semi-elliptic rear springs for the engine frame, the engine being mounted on the engine frame by a front cross spring and by rear quarter elliptic springs, the engine frame springs being mounted on the axles by rubber mountings, and the transmission being separate from the engine and clutch unit and mounted on the engine frame by rubber mountings.

Figure 4 is a plan view of a front wheel drive vehicle, showing a body frame mounted on semi-elliptic front springs and quarter elliptic rear springs and an engine frame mounted directly upon the rear axle and on a cross spring at the front, the engine being mounted directly on the engine frame.

Figure 5 is a plan view showing a body frame mounted on the front axle by quarter elliptic springs and on the rear axle by cantilever springs, the engine frame being mounted on the front axle by semi-elliptic springs and on the rear axle by a cross spring, the engine unit being mounted on the engine frame by rubber mountings, and the rear engine frame springs being mounted on the axle by rubber mountings, the front of the engine frame being attached to its springs by rubber mountings, and the front body springs being mounted directly on the axle.

Figure 6 is a detail showing one form of mounting for the clutch and brake pedals and for the emergency brake and gear shift levers on the body frame as either one or two units.

Figure 7 shows one form of flexible connection for the connecting rods connecting the clutch pedal and the gear shift lever to the power plant.

Figure 8 shows a detail of a form of rubber bumper attachable to one of the frames for limiting the relative movement of the two frames.

Figure 9:
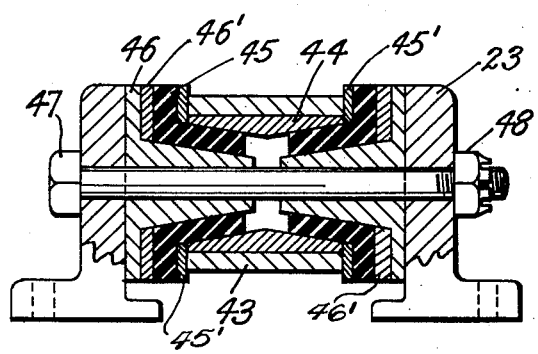
Figure 9 is a detail of one form of rubber spring mounting.

The running gear comprises the usual front and rear axles 2 and 3, and wheels 2' and 3'. Steering gear 4 is connected with the front wheels for steering the vehicle and is operated from the usual steering wheel 5.

The usual body frame is shown at 6, which in Figs. 1, 3 and 4, is supported on the front axle on semi-elliptic springs 7, and is supported at the rear in Fig. 1 on semi-elliptic springs 10 carried by the rear axle 3.

Figure 10:
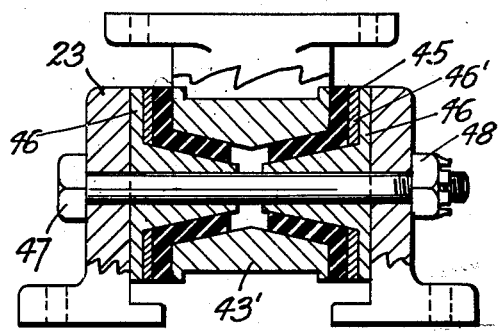
Figure 10 is a detail of one form of rubber engine mounting.

An engine frame is designated 14, which in Fig. 1 is mounted on a cross spring 15, the opposite ends of which are mounted on the front axle 2 by rubber mountings, such for instance as is shown in Fig. 9. The rear ends of the engine frame 14 are supported on rear quarter-elliptic springs 19, the outer ends of which are supported by rubber mountings 23 on the rear axle 3. The engine unit has an engine 1, and a transmission 1' connected together as a unit supported at three points on rubber mountings 23, such for instance as is shown in Fig. 10, there being two mountings at the rear of the engine, shown on opposite sides of the flywheel housing and mounted on the engine frame 14 and the front mounting 23 is connected with the engine in the longitudinal central vertical plane thereof, and mounts the front end of the engine directly on the cross spring 15. The engine drives the rear axle through the transmission 1' and the usual propeller shaft 60, which in Figures 2 and 5 is shown as surrounded by a torque tube 61 provided with radius rods 62. The usual clutch pedal is shown in Figure 1 as carried by the engine unit and is designated 25, while the brake pedal is designated 26. The emergency brake lever is likewise carried by the engine unit, as shown at 27, and the gear shift lever is shown at 28.

In Figure 1, I have shown parts of the usual operating structure of an automobile for purposes of illustration such for instance as the radiator designated 53 which is connected with the engine water jacket at opposite sides through the hose 55. The hood is partially shown at 54, and a part of the body at 56. The usual exhaust pipe 57 extends from the engine to a muffler 58, which is shown as supported by the engine frame 14.

The mounting of the engine unit is such that the impulses incident to the operation of the running engine tends to move the engine from side to side, and the mountings provide restrained freedom of movement in any direction, such that vibrations of the running engine are dissipated as much as possible and are not transmitted to the frame to any noticeable extent.

The principal differences between the forms shown in Figs. 1 to 5 is in the manner of supporting the respective body and engine frames 6 and 14. In Figure 2, the opposite ends of the body frame 6 are supported by front and rear cross springs 9 and 12 mounted on the front and rear axles 2 and 3. The engine frame 14 is supported in a manner similar to that shown in Figure 1, namely, on a front cross spring 15, and rubber mountings 23 connecting the ends of the cross spring 15 with the front axle 2 while the rear end of the engine frame 14 is supported on quarter-elliptic springs 19 and rubber mountings 23 on the rear axle 3. The engine unit is supported on rubber mountings 23 on the engine frame 14 and the cross spring 15, as described above. A starting switch is shown at 49 connected with the starter and the battery 59.

In Figure 3, the body frame 6 is supported at the front on semi-elliptic springs 7 mounted on the front axle 2 and the rear is supported on a cross spring 12 mounted on rubber mountings 23 on the rear axle 3. The engine frame 14 is supported on the rear axle 3 by semi-elliptic springs and on the front axle 2 by quarter elliptic springs 16. The front of the engine unit is supported on the engine frame by a rubber mounting 23 which is connected with the front of the engine and mounts the same on a cross spring 21, the ends of which are carried by the engine frame 14. Rear engine mountings comprise springs 22 mounting the rear end of the engine on the engine frame 14. The engine clutch lever is designated 35. In this form, the transmission 1' is mounted independently of the engine 1. The front end portion of the transmission 1' has laterally extending arms supported on the engine frame by rubber mountings 23, while the rear end portion of the transmission is mounted on a cross spring 22' the opposite ends of which are mounted on the engine frame by rubber mountings 23. Transmission shift rods are shown at 36 and 37.

In Figure 4, the invention is shown applied to a front wheel drive vehicle. The body frame 6 is mounted at the front on semi-elliptic springs 7 and at the rear on quarter-elliptic springs 11, connected with the rear axle 3. The engine frame 14 is mounted directly on the rear axle 3 and at the front on a cross spring 15 by rubber mountings 23. The opposite ends of the cross spring are connected with the front axle by rubber mountings 23. The engine unit 1 is mounted directly on the engine frame.

In Figure 5, the body frame 6 is mounted on the front axle by quarter-elliptic springs 8, and on the rear axle by cantilever springs 13. The engine frame 14 is mounted on the front axle by semi-elliptic springs 17, there being rubber mountings 23 between the engine frame and the springs and at the rear the engine frame is mounted on a cross spring 20 supported by the rear axle through rubber mountings 23. The engine unit 1 is supported at four points on the engine frame by rubber mountings 23.

For the sake of clearness as little of the details as possible have been shown on the main views, since any competent mechanic will be able to thoroughly understand the description by reference to the main views and the details, and since the parts of the steering, braking, starting, lighting, ignition, carburetion, power plant, manifolding, cooling and other mechanisms and details are well known and need no illustration or description.

Any of the various frame and spring constructions for mounting the body frame upon the axles may be used; the body frame may be made separate from the body and mounted separately on the axles, and the body subsequently attached to the body frame; or the body itself may be constructed to provide its own self-contained frame, both of which constructions are well known.

In this description, however, for the sake of clearness "body frame" is used as a generic term to indicate either the frame separate from the body or the frame as a part of the body.

In any case, the body frame is to be attached to its springs through either metallic or rubber mountings, and the springs properly mounted on the axles and properly proportioned to the load upon them, and their action may be controlled by any of the well known rebound snubbers, shock absorbers or bumper devices, properly mounted.

The power plant unit may be mounted upon the power plant frame either rigidly, or on springs, or on rubber mountings, or on spring and rubber mountings, depending upon the judgment of the designer and the particular conditions and the results required of each case.

The power plant frame may be mounted upon springs, and the springs mounted either directly upon the axles, or mounted upon the axles on rubber mountings; or the engine frame may even be mounted directly on the axles if desired, but as this is inclined to make the unsprung weight excessive, I consider the construction impractical except under some conditions for the rear axle mounting, or for very slow speed vehicles, or for railroad automotive equipment.

I have shown in Figures 9 and 10, two forms of rubber mountings 23 which may be used at the various points referred to above. In Figure 9, brackets are connected together by a bolt 47 and nut 48, which bolt extends through rubber bushing compressing flanges 46, having tapered portions extending into rubber bushings 45 which are disposed within a double tapered sleeve 44 on the inside of a spring eye 43 which may be the eye of any of the above-mentioned body or engine frame springs. Face washers 45' and adjustment washers 46' are disposed on opposite sides of the flanges of the rubber bushings 45.

In the form of rubber mountings shown in Figure 10, the construction is similar to that shown in Figure 9, except that a bracket is illustrated, adapted to be attached to the engine and provided with a mounting eye 43' having a tapered opening therein receiving the rubber bushings 45.

The character of each of these mountings is such that the load is only on a part of each bushing, leaving the flange and a part of the circumference of each bushing unloaded and free to resiliently oppose movement of the engine unit or frame thereagainst.

In the selection of the particular construction and combination of elements, and the forms or types thereof, the designer therefore has a wide range from which to choose to fit the particular conditions in question, including cost.

The power plant may even be incorporated to act as a part of the power plant frame, and to receive the front power plant springs direct; but this, and all of the other variations, have the main point in common, that is, the power plant is independently mounted upon the axles so that its vibration from whatever cause, before it is felt by the passengers, will have to be transmitted first to one or both of the axles and then from the axles through the body frame springs to the body frame.

If a cheap construction is desired, the clutch and brake pedals and the gear shift and emergency brake levers may be mounted in the usual manner upon the power plant as shown in Figure 1, and the relative movement between the power plant and the body frame held within the desired limits by means of any proper friction, hydraulic or other shock absorber or snubber devices, attached to the power plant or frame and to the body frame, and preferably having a free acting central movement permitting the vibration of the power plant due to engine and transmission vibration to take place independent of the body frame, while still permitting or causing the engine and body frames to move substantially as a unit under the action of road shocks as illustrated by the construction shown in Figure 8, wherein a bumper bracket 38 is adapted to be secured to the engine frame 14 and has a bifurcated end, the arms of which embrace a flange on the body frame 6 and have rubber bumper blocks 39 in position to engage opposite sides of said flange. This structure may be reversed, if desired, and the bracket 38 be connected with the body frame while a part of the engine frame extends between the bumper blocks 39.

In place of such a shock absorber or snubber device both the upward and the downward movements of the power plant with respect to the body frame may be limited as desired by properly placed rubber bumpers.

Figure 11:
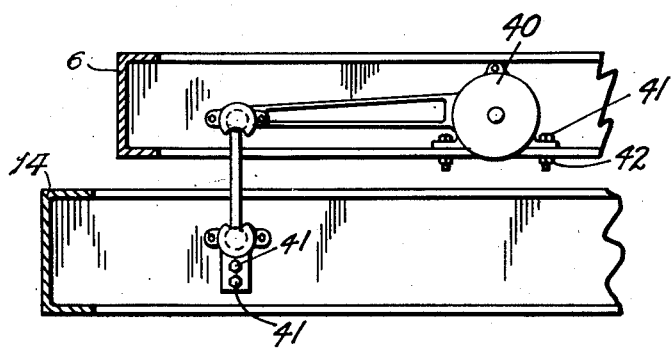
Figure 11 is a detail showing one form and position of shock absorber device connected between the two frames.

Or, the desired results may be obtained by equipping both frames with independent shock absorber or snubber devices, connecting with one or both axles. One form of such a shock absorber is shown in Figure 11, and is designated by the numeral 40, being secured to the respective frames 6 and 14 by mounting bolts 41 and nuts 42.

For the most complete results, however, I prefer, in addition to proper shock absorber or snubber devices, to mount the clutch and brake pedals, the emergency brake lever and the gear shift lever, all on the body frame, either as one unit, or with the pedals forming one unit and the levers forming another unit as indicated in Figure 6, wherein a rod 6a extends transversely of the body frame 6 and has its opposite ends fixed thereto. The clutch pedal 25', and the brake pedal 26', are mounted on the rod 6a. Also mounted on the transverse rod 6a is the gear shift lever 28' and emergency brake lever 27', where all of these are mounted as one unit, or they may be mounted on separate transverse rods as separate units. Gear shift rods 30 and 31 are adapted to be engaged by the shift lever 28' for operating the gears of the transmission. The clutch pedal and the gear shift lever are connected to the power plant by substantially horizontal rods, each provided with one or more non-metallic flexible cushion sections as indicated in Figure 7 to eliminate the transmission of vibration and to avoid noise, and to permit of the slight movement required in their operation. In Figure 7, I have shown the clutch connecting rod 29 as made in two parts with a rubber cushion 23 between the ends and surrounded by a cushion tube or hose 32 secured to the adjacent ends of the sections of the connecting rod 29 by clamps 34 secured by clamp bolts 34' and nuts 34''.

But, whether the other controls are mounted partly on the body frame and partly on the power plant, or all on the body frame, or all on the power plant, the steering gear in any case is mounted on the body frame, so that it will be entirely free from any direct connection with and vibration from the power plant.

As will now be seen in the drawings, the body frame 6 of whatever form and construction and whether separate from or integral with the body, is mounted upon the axles by whatever springs or combinations of springs, and with the ordinary spring bolt or metallic mounting or with rubber mountings of any proper construction, connecting the springs to the body frame.

The power plant frame 14, of whatever form or construction, is mounted upon the axles 2 and 3, either directly and with or without rubber mountings, or through whatever springs or combination of springs, either with or without rubber mountings since the exact details are of relatively small importance and subject to great variation, but in any case the main result should be the same that the power plant frame is to be properly mounted on the axles normally independent of the body frame.

The transmission may either be a unit with the engine, or may be mounted separately upon the engine frame 14 as shown in Figure 3 and either directly, with or without rubber mountings, or through springs, with or without rubber mountings, the main result in any case being the same in that both engine and transmission are carried by the power plant frame.

The transmission shaft may be connected to the rear axle by either an open propeller shaft and universal joint construction, or by a shaft enclosed in a torque tube attached to the rear axle.

The engine is connected by the exhaust pipe to the muffler which is mounted upon the engine frame 14.

The radiator may be mounted upon the power plant or upon the power plant frame as shown in Figure 1 and spaced slightly from the hood to permit relative movement between them, or the radiator may be mounted on the body frame in the usual manner and extra long flexible hose connections employed between the engine and the radiator, or short connections of a sufficiently flexible and elastic nature may be employed to permit the relative movement which occurs, in either case the result being the same in that the engine may be connected to and cooled by the radiator in spite of the differential action of the two frames.

The steering wheel and gear of whatever type or construction is to be properly mounted on the body frame 6 and connected to the front wheels to steer them.

And in the ordinary course of construction this power unit would be first assembled and could then be pushed about on its own wheels during the further process of assembling the complete vehicle.

This first assembly forms the power unit.

The next step in the process of assembling would be to assemble the body frame, the body, the steering gear, the fenders and running boards and other parts that mount upon the body frame or the body.

This second assembly forms the load unit.

The next step in the assembly of the vehicle would be to mount the load unit upon the axles of the power unit.

It will be obvious to anyone skilled in automotive vehicles that any of the power units shown may be combined with any desired load unit indicated so long as the final result is a vehicle having all the parts and construction required for its operation and control, and in which the relative movements of the two units does not interfere with the operation and control of the vehicle.

In Figure 1, the power unit has a cross spring in front and quarter elliptic springs at the rear, and the load unit is attached to the power unit through semi-elliptic springs all around.

In Figure 2, the power unit has a cross spring in front and quarter elliptic springs at the rear and the load unit is attached to the power unit by front and rear cross springs.

In Figure 3, the power unit has a quarter elliptic spring in front and semi-elliptic springs at the rear and the load unit is attached to the power unit by semi-elliptic springs in front and a cross spring at the rear.

In Figure 4, the power unit has a cross spring in front and is rigidly attached to the axle at the rear, and the load unit is attached to the power unit by semi-elliptic springs in front and quarter elliptic springs at the rear.

In Figure 5 the power unit has a semi-elliptic spring in front and a cross spring at the rear and the load unit is attached to the power unit by quarter elliptic springs in front and cantilever springs at the rear.

As shown in Figure 1, the steering gear in any case is to be mounted upon the frame of the load unit.

If the cheap construction mentioned above is employed the power unit is also provided with clutch and brake pedals, emergency brake and gear shift levers, and starter switch.

And if the more refined construction is employed the steering construction, throttle and spark controls, starter switch, clutch pedal, brake pedal, emergency brake and gear shift levers, are all mounted upon the load unit and are connected to the co-acting parts of the power unit.

Of course, any proper combination of the cheap and the refined constructions may be employed that will satisfy the particular requirements of any individual case.

The battery and the starter switch may either of them be mounted upon either the power or the load unit, and the connecting wires of the system are each in any case to be made of the proper length to permit any movement incident to their mounting without undue strain upon the terminals.

Either of the throttle and spark control constructions shown may be employed or any other construction which will permit one end to be mounted on the load unit and the other end to be mounted upon the power unit, whereby the control of the throttle and of the spark will be substantially unaffected by any relative movement of the power and load units.

Figure 12:
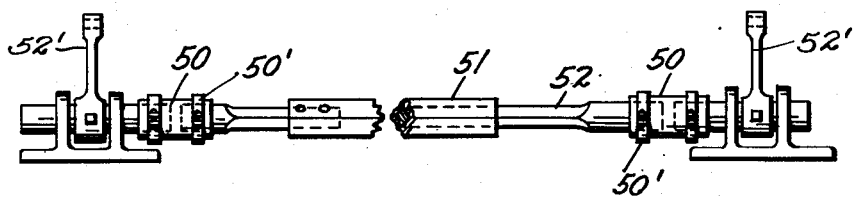
Figure 12 is a detail showing throttle and spark connections adapted to extend substantially horizontal between the body frame and the engine.
Figure 13:
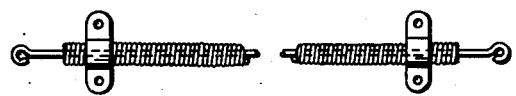
Figure 13 is a modified form of spark and throttle control, the ends of which are to be mounted upon the body frame and the power plant respectively.

In Figure 12, I have shown a form of throttle and spark connections that may extend substantially horizontally between the body frame and the engine. A throttle and spark tube is shown at 51 having one end secured to one section of a throttle and spark rod 52, the other section of which slidably extends into said tube 51. The ends of the throttle and spark rod sections are connected through flexible joints 50, shown as made of hose secured to the parts by clamps 50' and connected with the throttle and spark controls 52'.

It will be seen by any competent mechanic that in many of the details of such a construction there are variations and alternatives open to the designer by which substantially the same results may be obtained without departing from the essence of my invention; and that there are various constructions and combinations of elements which would obtain imperfect results without departing from the essence of my invention.

Therefore, I do not wish to be narrowly limited to the exact constructions illustrated and described, but what I claim as new and desire to protect by Letters Patent, is as follows:—

1. In an automotive vehicle, the combination of a frame, means supporting said frame including an axle supported spring, an engine unit having a portion thereof mounted on the frame, and non-metallic resilient means supporting another portion of the engine unit on the spring.

2. In an automotive vehicle, the combination of a frame, means supporting said frame including an axle supported spring, an engine unit, means mounting an end portion of the engine unit on the frame, and non-metallic resilient means mounting the opposite end portion of the engine unit directly on the spring.

3. In an automotive vehicle, the combination of wheel-supported axles, a transversely extending spring, non-metallic resilient means mounting the opposite end portions of said spring on an axle, a frame having one end portion mounted on said spring, means mounting the opposite end portion of said frame on the other axle, an engine unit, and non-metallic resilient means mounting longitudinally spaced portions of the engine unit on the frame and spring.

4. In an automotive vehicle, the combination of wheel and axle means, an engine unit, and means for mounting the engine unit on the vehicle comprising a metallic structure, non-metallic resilient means supporting a portion of the engine unit on said metallic structure, and non-metallic resilient means supporting said metallic structure on the wheel and axle means of the vehicle and permitting bodily movement thereof.

5. In an automotive vehicle, the combination of wheel and axle means, an engine unit, and means for mounting the engine unit on the vehicle comprising a floating metallic member, non-metallic resilient means supporting a portion of the engine unit on said metallic member, and non-metallic resilient means supporting said metallic member on the wheel and axle means of the vehicle and permitting bodily movement thereof, said non-metallic means being of substantial thickness and free flowing.

6. In an automotive vehicle, the combination of wheel and axle means, an engine unit, and means for mounting the engine unit on the vehicle comprising a leaf-spring, non-metallic resilient means mounting a portion of the engine unit on said leaf-spring, and non-metallic resilient means supporting said leaf-spring on the wheel an axle means of the vehicle and located a substantial distance below the first-mentioned resilient means for permitting compound motion of the engine unit.

ROLLAND S. TROTT.